United States Patent
Field

(10) Patent No.: US 7,367,347 B2
(45) Date of Patent: May 6, 2008

(54) PORTABLE STABILIZER APPARATUS FOR A STANDING PASSENGER

(76) Inventor: Ross Field, 435 W. 57th St., Apt. 15E, New York, NY (US) 10019

( * ) Notice: Subject to any disclaimer, the term of this patent is extended or adjusted under 35 U.S.C. 154(b) by 85 days.

(21) Appl. No.: 11/030,265

(22) Filed: Jan. 6, 2005

(65) Prior Publication Data

US 2006/0144433 A1    Jul. 6, 2006

(51) Int. Cl.
*A45B 3/00*    (2006.01)
(52) U.S. Cl. .......................... 135/66; 135/86; 294/19.1
(58) Field of Classification Search ............... 135/25.4, 135/25.1, 66, 65, 75, 77, 86; 294/19.1, 64.1; 248/351, 354.1, 357, 362, 363
See application file for complete search history.

(56) References Cited

U.S. PATENT DOCUMENTS

| | | | |
|---|---|---|---|
| 2,545,043 A * | 3/1951 | Odenthal ................... | 81/53.11 |
| 3,866,619 A | 2/1975 | Per Frisk | |
| 3,956,784 A | 5/1976 | Vargas | |
| 3,987,807 A * | 10/1976 | Varnell ........................ | 135/66 |
| 4,037,839 A * | 7/1977 | Nelson ....................... | 463/47.7 |
| 4,527,824 A * | 7/1985 | Rosenfeld ................... | 294/64.1 |
| 4,928,916 A | 5/1990 | Molloy | |
| 5,148,723 A * | 9/1992 | Newman et al. ........... | 81/53.11 |
| 5,317,855 A | 6/1994 | De Leeuw | |
| 5,913,783 A | 6/1999 | Weener et al. | |
| 6,553,872 B1 * | 4/2003 | Tse et al. .................... | 81/53.11 |
| 2004/0189028 A1 * | 9/2004 | Newman et al. ........... | 294/19.1 |
| 2005/0181886 A1 * | 8/2005 | Zmetra ....................... | 473/286 |
| 2006/0290152 A1 * | 12/2006 | Robinson ................... | 294/64.1 |

* cited by examiner

*Primary Examiner*—David Dunn
*Assistant Examiner*—Noah Chandler Hawk

(57) ABSTRACT

A portable stabilizer apparatus is provided for a standing passenger who is standing below a ceiling in a mass transit vehicle; and the portable stabilizer apparatus includes a handle assembly which includes a hand grip region, a finger-operated latch member, and an finger-operated actuator switch. Telescopic units are connected to the handle assembly actuation and are controlled by the finger-operated latch member. The telescopic units include an end extension unit, and the end extension unit includes a suction cup for attaching to the ceiling of the vehicle. A ceiling-attachment release mechanism is housed within the telescopic units and is connected between the finger-operated actuator switch and the suction cup for releasing the suction cup from the ceiling. Extension power, either manual or mechanical, is used for extending the telescopic units toward the ceiling of the vehicle.

2 Claims, 3 Drawing Sheets

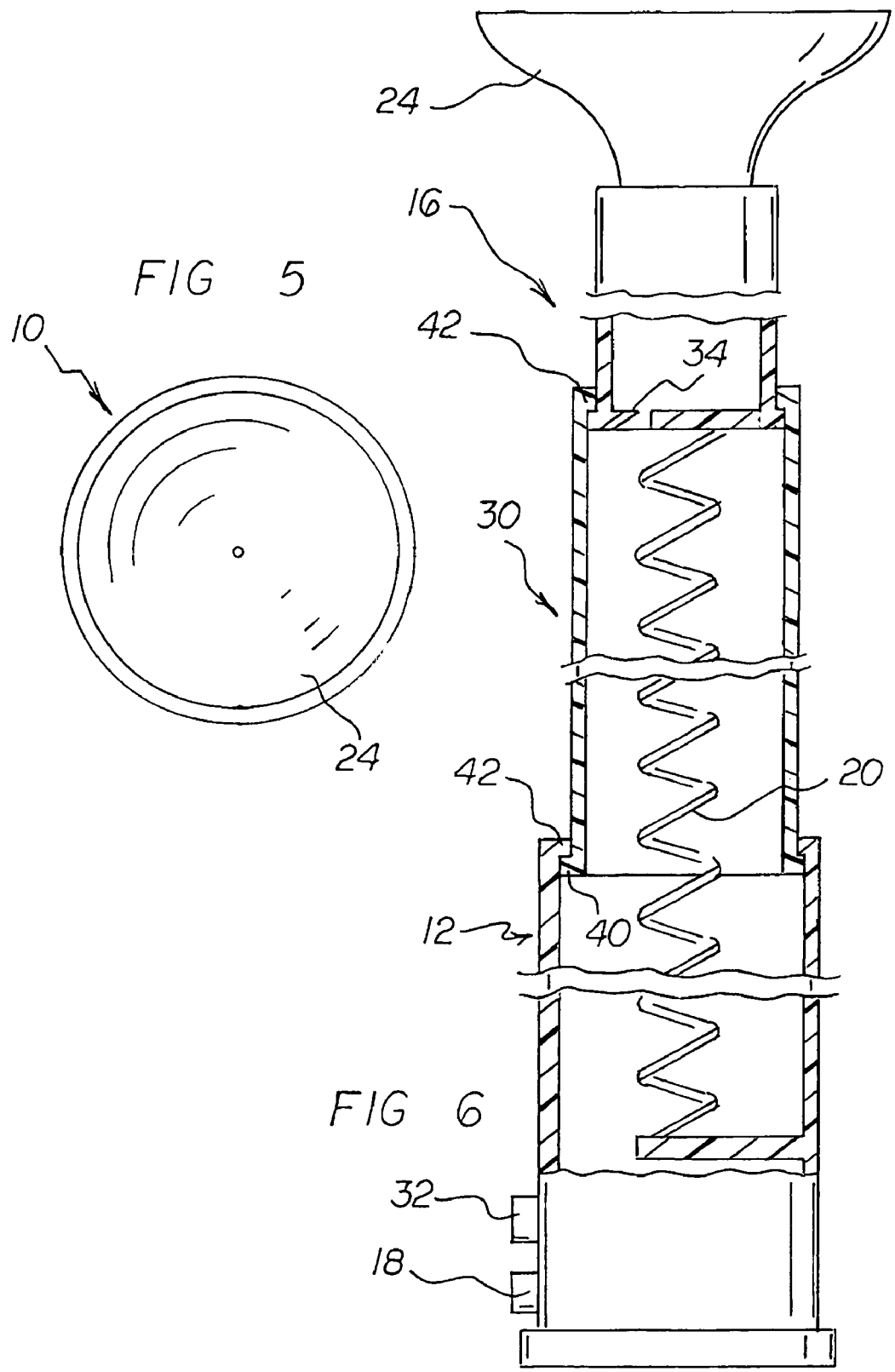

PORTABLE STABILIZER APPARATUS FOR A STANDING PASSENGER

BACKGROUND OF THE INVENTION

1. Field of the Invention

The present invention relates generally to stabilizers for standing passengers in a mass transit vehicle, and, more particularly, to a portable stabilizer especially adapted for carrying by a standing passenger.

2. Description of the Prior Art

When the seats of mass transit vehicles, such as subway cars and busses, are occupied, additional passengers have to stand. It is often difficult for a standing passenger to maintain one's balance, especially when the mass transit vehicle makes abrupt stops and starts. Generally, the mass transit vehicles have a limited number of horizontally oriented and vertically oriented bars that the standing passenger can hold onto. Yet, the standing passenger may not wish to grab onto the existing hold-on bars for sanitary reasons. No one can know who has recently held onto a nearby hold-on bar and no one can know the state of health of that other person. In this respect, it would be desirable if a standing passenger can bring along one's own hold-on bar to avoid problems of sanitation of previous holders of existing hold-on bars in the mass transit vehicle.

During overcrowding of a mass transit vehicle, the existing hold-on bars may all be used by other standing passengers. Therefore, it would be desirable if a standing passenger could bring along one's own portable hold-on bar to provide oneself with stability when the existing hold-on bars in the mass transit vehicle are all being used by other passengers.

Sometimes, in the absence of an existing hold-on bar to hold onto, a person, especially a child, will hold onto the clothing of a parent. Often such clothing gets torn when abrupt starts and stops are made. In this respect, it would be desirable to provide a device which would preclude the need for a child to hold onto the clothing of an adult to maintain stability in a mass transit vehicle.

Still other features would be desirable in a portable stabilizer device for a 1 standing passenger. For example, it would be desirable if such a portable stabilizer device could occupy only a small space when not in use, when being stored, and could extend to an appropriate length when being used. More specifically, it would be desirable if such a portable stabilizer device were provided which is retractable when not in use for storage and extendable when in use for stabilizing a standing passenger. When in the retracted condition, the portable stabilizer device can be carried in a purse, backpack, briefcase, etc.

Also, when a portable stabilizer device for a standing passenger in a mass transit vehicle is employed, when the standing passenger wants to move from one standing position to another standing position in the mass transit vehicle, or wants to sit down in a seat, or wants to exit from the vehicle, the connection between the portable stabilizer device and the mass transit vehicle should be easily broken.

The following U.S. patents may be of interest for their disclosure of telescopic extendable and retractable poles: U.S. Pat. Nos. 3,866,619, 3,956,784, 4,928,916, 5,317,855, and 5,913,783. Each of the above-mentioned patents has a common characteristic. Each patented device is a telescopic pole support that extends between a fixed top horizontal surface (such as a ceiling) and a fixed bottom horizontal surface (such as a floor). None of the above-mentioned patents discloses a hand-held, portable device that is used by a person, such as a standing passenger in a mass transit vehicle, to stabilize the person from losing one's balance during abrupt stops and starts of the mass transit vehicle.

Thus, while the foregoing body of prior art indicates it to be well known to use telescopic pole support devices between fixed floors and ceilings, the prior art described above does not teach or suggest a portable stabilizer apparatus for a standing passenger which has the following combination of desirable features: (1) permits a standing passenger to bring along one's own hold-on bar into a mass transit vehicle to avoid problems of sanitation of previous holders of existing hold-on bars in the vehicle; (2) permits a standing passenger in a mass transit vehicle to bring along one's own portable hold-on bar to provide oneself with stability when the existing hold-on bars in the vehicle are all being used by other passengers; (3) provides a device which precludes the need for a child to hold onto the clothing of an adult to maintain stability in a mass transit vehicle; (4) is retractable when not in use for storage and extendable when in use for stabilizing a standing passenger; and (5) provides that the connection between the portable stabilizer apparatus and the mass transit vehicle can be easily broken when the passenger wants to move from a particular standing location in the vehicle.

The foregoing desired characteristics are provided by the unique portable stabilizer apparatus for a standing passenger of the present invention as will be made apparent from the following description thereof. Other advantages of the present invention over the prior art also will be rendered evident.

SUMMARY OF THE INVENTION

To achieve the foregoing and other advantages, the present invention, briefly described, provides a portable stabilizer apparatus for a standing passenger who is standing below a ceiling in a mass transit vehicle; and the portable stabilizer apparatus includes a handle assembly which includes a hand grip region, telescopic extension actuation means, and ceiling-attachment release control means. Telescopic unit means are connected to the handle assembly actuation and controlled by the telescopic extension actuation means. The telescopic unit means include an end extension unit, and the end extension unit includes ceiling-attachment means for attaching to the ceiling of the mass transit vehicle. Ceiling-attachment release means are housed within the telescopic unit means and are connected between the ceiling-attachment release control means and the ceiling-attachment means for releasing the ceiling-attachment means from the ceiling. Extension power means are used for extending the telescopic unit means toward the ceiling of the mass transit vehicle.

In one embodiment of the invention, the muscles of the user's arms serve as the extension power means if the user manually extends the telescopic unit means. A locking mechanism would be provided to maintain the telescopic unit means in the extended condition.

With other embodiments of the invention, the extension power means can be housed within the telescopic unit means and are connected to the telescopic extension actuation means for extending the telescopic unit means toward the ceiling of the mass transit vehicle.

Preferably, the telescopic extension actuation means include finger-operated latch means. Preferably, the finger-operated latch means include a finger-operated latch member and a latch bias spring for urging the finger-operated latch member into a latching condition.

The extension power means can include a motive power unit, operated by the finger-operated latch member, for extending the telescopic unit means when the apparatus is in the extended condition. A lock flange is located on a bottom portion of the end extension unit.

The finger-operated latch member includes a latch hook portion for engaging the lock flange when the apparatus is in a retracted condition.

Preferably, the ceiling-attachment means include a suction cup, and the ceiling-attachment release control means include a finger-operated actuator switch. The ceiling-attachment release means can include a battery-powered motor which is electrically connected to the finger-operated actuator switch, and suction-cup distortion means are connected to the battery-powered motor and to the suction cup for distorting the suction cup for breaking a suction attachment between the suction cup and the ceiling.

The suction-cup distortion means can include a ram in contact with the battery-powered motor. A push rod is connected between the ram and the suction cup. When the battery-powered motor is activated, the push rod distorts the suction cup causing the suction to be broken and the suction cup to be released from the ceiling.

Preferably, the telescopic unit means include an intermediate telescopic unit which is connected between the handle assembly and the end extension unit.

With another embodiment of the invention, the motive power unit includes a spring that is connected between the handle assembly and the end extension unit for moving the end extension unit away from the handle assembly toward the ceiling when the apparatus is in the extended condition.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable stabilizer apparatus for a standing passenger which has all of the advantages of the prior art and none of the disadvantages.

It is another object of the present invention to provide a new and improved portable stabilizer apparatus for a standing passenger which may be easily and efficiently manufactured and marketed.

It is a further object of the present invention to provide a new and improved portable stabilizer apparatus for a standing passenger which is of durable and reliable construction.

An even further object of the present invention is to provide a new and improved portable stabilizer apparatus for a standing passenger which is susceptible of a low cost of manufacture with regard to both materials and labor, and which accordingly is then susceptible of low prices of sale to the consuming public, thereby making such portable stabilizer apparatus for a standing passenger available to the buying public.

Still yet a further object of the present invention is to provide a new and improved portable stabilizer apparatus for a standing passenger which permits a standing passenger to bring along one's own hold-on bar into a mass transit vehicle to avoid problems of sanitation of previous holders of existing hold-on bars in the vehicle.

Still another object of the present invention is to provide a new and improved portable stabilizer apparatus for a standing passenger that permits a standing passenger in a mass transit vehicle to bring along one's own portable hold-on bar to provide oneself with stability when the existing hold-on bars in the vehicle are all being used by other passengers.

Yet another object of the present invention is to provide a new and improved portable stabilizer apparatus for a standing passenger which provides a device which precludes the need for a child to hold onto the clothing of an adult to maintain stability in a mass transit vehicle.

Even another object of the present invention is to provide a new and improved portable stabilizer apparatus for a standing passenger that is retractable when not in use for storage and extendable when in use for stabilizing a standing passenger.

Still a further object of the present invention is to provide a new and improved portable stabilizer apparatus for a standing passenger which provides that the connection between the portable stabilizer apparatus and the mass transit vehicle can be easily broken when the passenger wants to move from a particular standing location in the vehicle.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 5 is a top view of the embodiment of the invention shown in FIG. 3 taken along line 5-5 thereof.

FIG. 6 is a partially compressed cross-sectional view of a second embodiment of the invention which includes an internal spring mechanism.

DESCRIPTION OF THE PREFERRED EMBODIMENT

Figures 1, 2:
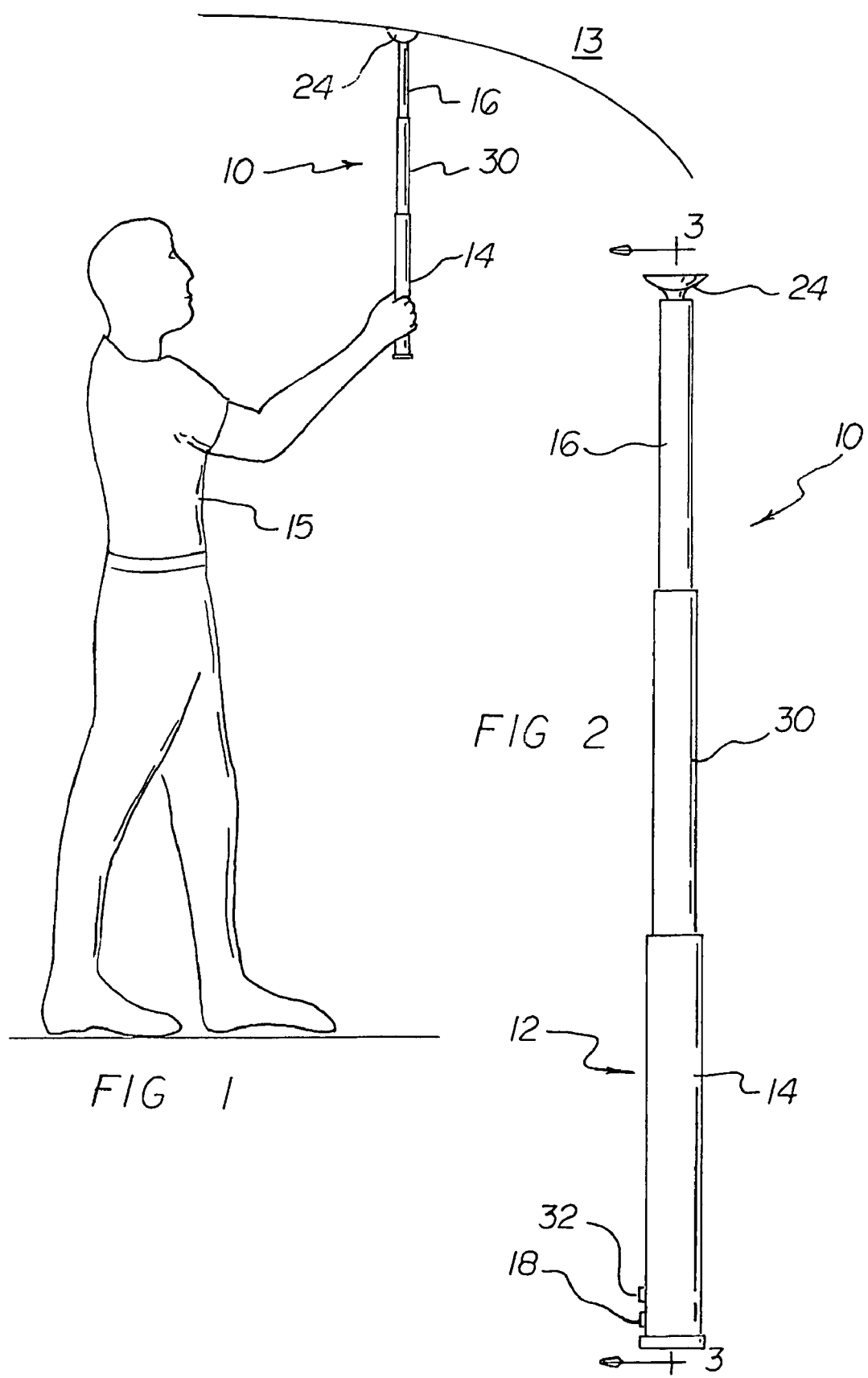
FIG. 1 is a side view showing a first embodiment of the portable stabilizer apparatus for a standing passenger of the invention, in use in the extended condition and attached to the ceiling of a mass transit vehicle, such as a subway car.
FIG. 2 is an enlarged side view of the embodiment of the portable stabilizer apparatus for a standing passenger shown in FIG. 1.

With reference to the drawings, a new and improved portable stabilizer apparatus for a standing passenger embodying the principles and concepts of the present invention will be described.

Turning to FIGS. 1-5, there is shown a first embodiment of the portable stabilizer apparatus for a standing passenger of the invention generally designated by reference numeral 10. In the first embodiment, a portable stabilizer apparatus 10 is provided for a standing passenger 15 who is standing below a ceiling 13 in a mass transit vehicle; and the portable stabilizer apparatus 10 includes a handle assembly 12 which includes a hand grip region 14, telescopic extension actuation means, and ceiling-attachment release control means. Telescopic unit means are connected to the handle assembly actuation 12 and controlled by the telescopic extension actuation means. The telescopic unit means include an end extension unit 16, and the end extension unit 16 includes ceiling-attachment means for attaching to the ceiling 13 of the mass transit vehicle. Ceiling-attachment release means are housed within the telescopic unit means and are connected between the ceiling-attachment release control means and the ceiling-attachment means for releasing the ceiling-attachment means from the ceiling 13. Extension power means are used for extending the telescopic unit means toward the ceiling 13 of the mass transit vehicle.

In one embodiment of the invention, the muscles of the user's arms serve as the extension power means if the user manually extends the telescopic unit means. A locking mechanism would be provided to maintain the telescopic unit means in the extended condition.

With other embodiments of the invention, the extension power means can be housed within the telescopic unit means and are connected to the telescopic extension actuation means for extending the telescopic unit means toward the ceiling 13 of the mass transit vehicle.

Preferably, the telescopic extension actuation means include finger-operated latch means. Preferably, the finger-operated latch means include a finger-operated latch member 32 and a latch bias spring 38 for urging the finger-operated latch member 32 into a latching condition.

The extension power means can include a motive power unit, operated by the finger-operated latch member 32, for extending the telescopic unit means when the apparatus is in the extended condition. A lock flange 34 is located on a bottom portion of the end extension unit 16.

In one embodiment of the invention, the motive power unit can be a battery-powered motor. The finger-operated latch member 32 includes a latch hook portion 36 for engaging the lock flange 34 when the apparatus is in a retracted condition.

Preferably, the ceiling-attachment means include a suction cup 24, and the ceiling-attachment release control means include a finger-operated actuator switch 18. The ceiling-attachment release means can include a battery-powered motor 22 which is electrically connected to the finger-operated actuator switch 18, and suction-cup distortion means are connected to the battery-powered motor 22 and to the suction cup 24 for distorting the suction cup 24 for breaking a suction attachment between the suction cup 24 and the ceiling 13.

The suction-cup distortion means can include a ram 26 in contact with the battery-powered motor 22. A push rod 28 is connected between the ram 26 and the suction cup 24. When the battery-powered motor 22 is activated, the push rod 28 distorts the suction cup 24 causing the suction to be broken and the suction cup 24 to be released from the ceiling 13.

Preferably, the telescopic unit means include an intermediate telescopic unit 30 is connected between the handle assembly 12 and the end extension unit 16.

Turning to FIG. 6, a second embodiment of the invention is shown. Reference numerals are shown that correspond to like reference numerals that designate like elements shown in the other figures. In addition, a. A The motive power unit includes a spring 20 is connected between the handle assembly 12 and the end extension unit 16 for moving the end extension unit 16 away from the handle assembly 12 toward the ceiling 13 when the apparatus is in the extended condition.

Figures 3, 4:
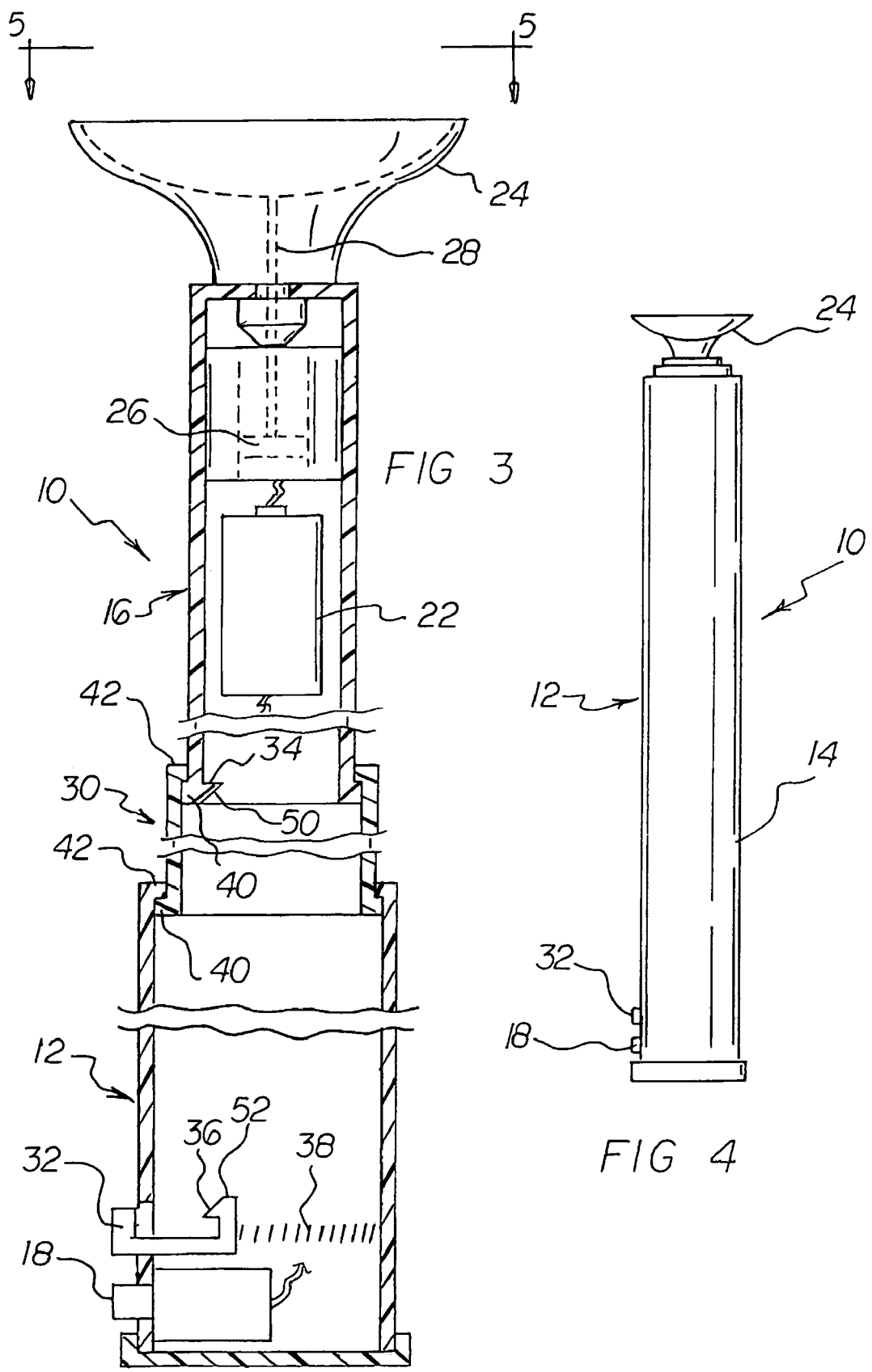
FIG. 3 is a partially compressed cross-sectional view of the embodiment of the portable stabilizer apparatus for a standing passenger of FIG. 2 taken along line 3-3 thereof.
FIG. 4 is a side view of the first embodiment of the invention in a retracted condition.

To operate either embodiment of the portable stabilizer apparatus 10 of the invention, the portable stabilizer apparatus 10 is obtained in the retracted condition as shown in FIG. 4. The user, who is a standing passenger, presses the finger-operated latch member 32 which causes the latch hook portion 36 to disengage from the lock flange 34. As a result, the intermediate telescopic unit 30 can be extended out from the handle assembly 12, and the end extension unit 16 can be extended out from the intermediate telescopic unit 30. Inwardly projecting stop flanges 40 engage with complementary outwardly projecting stop flanges 42, whereby the respective telescopic units are prevented from slipping out from one another. The portable stabilizer apparatus 10 is shown in the extended condition in FIGS. 1, 2, 3, and 6.

The extension of the respective telescopic units can be carried out in an number of ways. With one way, the user manually pulls the end extension unit 16 in a direction away from the handle assembly 12. With another way. A motive power unit can be employed. With yet another way, as shown in FIG. 6. A spring 20 can be used to extend the telescopic units with respect to one another.

Once the telescopic units have been extended, the user grasps the hand grip region 14 and raises the end extension unit 16 to the ceiling 13 of the mass transit vehicle. Then, the user presses the suction cup 24 against the ceiling 13 to establish a suction-cup attachment of the suction cup 24 to the ceiling 13. With the suction cup 24 attached to the ceiling 13 in this way and with the user holding onto the hand grip region 14 of the apparatus, the portable stabilizer apparatus 10 of the invention stabilizes the user, who is a standing passenger, is stabilized in the standing position when the mass transit vehicle makes abrupt starts and stops.

When the user wishes to disengage the suction cup 24 from the ceiling 13 for any reason, the user presses on the finger-operated actuator switch 18 which actuates the battery-powered motor 22 to drive the ram 26 to push the push rod 28 to distort the suction cup 24. When the suction cup 24 is distorted as described, the suction exerted by the suction cup 24 on the ceiling 13 is broken, and the suction cup 24 is released from the ceiling 13.

Once the suction cup 24 has been disengaged from the ceiling 13, the portable stabilizer apparatus 10 can be moved to another position on the ceiling 13 and re-engaged, or the user can collapse the apparatus into the retracted condition for storage. When the portable stabilizer apparatus 10 is placed in the retracted condition, the bottom, outwardly sloped surface 50 of the lock flange 34 slides over the top, inwardly sloped surface 52 of the latch hook portion 36 of the finger-operated latch member 32 so that the lock flange 34 is locked against the latch hook portion 36. The latch bias spring 38 keeps the finger-operated latch member 32 in the locked position until the user presses the finger-operated latch member 32 to release the lock flange 34 from the latch hook portion 36.

The components of the portable stabilizer apparatus for a standing passenger of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved portable stabilizer apparatus for a standing passenger that is low in cost, relatively simple in design and operation, and which may advantageously be used to permit a standing passenger to bring along one's own hold-on bar into a mass transit vehicle to avoid problems of sanitation of previous holders of existing hold-on bars in the vehicle. With the invention, a portable stabilizer apparatus for a standing passenger is provided which permits a standing passenger in a mass transit vehicle to bring along one's own portable hold-on bar to provide oneself with stability when the existing hold-on bars in the vehicle are all being used by other passengers. With the invention, a portable stabilizer apparatus for a standing passenger provides a device which precludes the need for a child to hold onto the clothing of an adult to maintain stability in a mass transit vehicle. With the invention, a portable stabilizer apparatus for a standing passenger is provided which is retractable when not in use for storage and extendable when in use for stabilizing a standing passenger. With the invention, a portable stabilizer apparatus for a standing passenger provides that the connection between the portable stabilizer apparatus and the mass transit vehicle can be easily broken when the passenger wants to move from a particular standing location in the vehicle.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use. For example, as will occur to those of ordinary skill in the art, the apparatus of the present invention may be used by any person to stabilize his or her position relative to a portion of a surface on a wall, ceiling, floor or other proximal structure or structural component.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by LETTERS PATENT of the United States is as follows:

1. A portable stabilizer apparatus for a person who is positioned relative to a surface component of a structure, comprising:

a handle assembly which includes a hand grip region, telescopic extension actuation means, and attachment release control means, telescopic unit means connected to said handle assembly and controlled by said telescopic extension actuation means, wherein said telescopic unit means include an end extension unit, and wherein said end extension unit includes attachment means for attaching to said surface component, end extension unit attachment release means, housed within said telescopic unit means and connected between said attachment release control means and said attachment means, for releasing said attachment means from the structure surface component, and extension means for extending said telescopic unit means toward said structure surface component, wherein ceiling-attachment release control means include a finger-operated actuator switch, wherein said ceiling-attachment release means include:

a battery-powered motor electrically connected to said finger-operated actuator switch, and suction-cup distortion means connected to said battery-powered motor and to said suction cup for distorting said suction cup for breaking a suction attachment between said suction cup and the ceiling, and wherein said suction-cup distortion means include:

a ram in contact with said battery-powered motor, a push rod connected between said ram and said suction cup.

2. The apparatus of claim 1 wherein said telescopic unit means include:

an intermediate telescopic unit connected between said handle assembly and said end extension unit.

* * * * *